US008570928B2

(12) United States Patent
Wu (10) Patent No.: US 8,570,928 B2
(45) Date of Patent: Oct. 29, 2013

(54) METHOD OF HANDLING MULTIMEDIA BROADCAST MULTICAST SERVICE DATA RECEPTION ON MULTIPLE COMPONENT CARRIERS (75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 474 days.

(21) Appl. No.: 12/826,661

(22) Filed: Jun. 29, 2010

(65) Prior Publication Data

US 2011/0013550 A1    Jan. 20, 2011

Related U.S. Application Data

(60) Provisional application No. 61/226,293, filed on Jul. 17, 2009.

(51) Int. Cl.
*H04H 20/71* (2008.01)

(52) U.S. Cl.
USPC ............................ 370/312; 370/396; 370/422

(58) Field of Classification Search
USPC ............... 370/312, 320, 343, 452.2, 396, 422
See application file for complete search history.

(56) References Cited

U.S. PATENT DOCUMENTS

| 7,436,811 | B2* | 10/2008 | Putcha et al. | 370/343 |
| 8,179,829 | B2* | 5/2012 | Bui et al. | 370/312 |
| 2002/0049051 | A1* | 4/2002 | Parisel et al. | 455/422 |
| 2004/0042479 | A1* | 3/2004 | Epstein et al. | 370/432 |
| 2006/0098567 | A1* | 5/2006 | Willenegger et al. | 370/206 |
| 2008/0080471 | A1* | 4/2008 | Rinne | 370/343 |
| 2009/0316614 | A1* | 12/2009 | Kim et al. | 370/312 |
| 2010/0061285 | A1* | 3/2010 | Maeda et al. | 370/312 |
| 2010/0232373 | A1* | 9/2010 | Nory et al. | 370/329 |

FOREIGN PATENT DOCUMENTS

| CN | 101310540 A | 11/2008 | |
| EP | 1 983 702 A2 | 10/2008 | |
| EP | 2 242 300 A1 | 10/2010 | |
| WO | 2007061866 A2 | 5/2007 | |
| WO | 2008052625 A1 | 5/2008 | |
| WO | WO2008082572 | * 7/2008 | H04L 12/56 |

OTHER PUBLICATIONS

Nokia: "Review of MBMS FDD physical layer enhancements WID", 3GPP TSG-RAN Working Group 1 (Radio) meeting #48, R1-071121, Feb. 12-16, 2007, XP050105111, St Louis, USA.

(Continued)

*Primary Examiner* — Ricky Ngo
*Assistant Examiner* — Dewanda Samuel
(74) *Attorney, Agent, or Firm* — Winston Hsu; Scott Margo (57) ABSTRACT

A method of handling multimedia broadcast multicast service (MBMS) data reception on multiple component carriers for a mobile device in a wireless communication system is disclosed. The mobile device has a maximum component carrier capability indicating the maximum number of component carriers accessible for the mobile device. The method comprises the steps of receiving a broadcast message or a dedicated message sent by the network, obtaining information about the number of the component carriers configured for the MBMS data reception, from the broadcast message or the dedicated message, and sending a first message to inform the network of a component carrier capability indicating the number of the component carriers on which the mobile device is not configured by the network to receive the MBMS data.

14 Claims, 4 Drawing Sheets

(56) References Cited

OTHER PUBLICATIONS

3rd Generation Partnership Project; Technical Specification Group Radio Access Network; Further Advancements for E-UTRA Physical Layer Aspects (Release 9), 3GPP TR 36.814 V1.2.0 (Jun. 2009), front page+ pages 2-37, XP050351392, Sophia Antipolis, France.

Huawei: "Carrier aggregation in Advanced E-UTRA", 3GPP TSG-RAN WG1#53bis, R1-082448, Jun. 30-Jul. 4, 2008, XP050110721, Warsaw, Poland.

3GPP TR 36.814 V0.4.1 3rd Generation Partnership Project; Technical Specification Group Radio Access Network; Further Advancements for E-UTRA Physical Layer Aspects, Feb. 2009.

3GPP TS 36.300 V9.0.0 (Jun. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

Office action mailed on Aug. 31, 2012 for the China application No. 20100233901.7 filing date Jul. 16, 2010, p. 1-5, 14-15.

* cited by examiner

METHOD OF HANDLING MULTIMEDIA BROADCAST MULTICAST SERVICE DATA RECEPTION ON MULTIPLE COMPONENT CARRIERS

CROSS REFERENCE TO RELATED APPLICATIONS

This application claims the benefit of U.S. Provisional Application No. 61/226,293, filed on Jul. 17, 2009 and entitled "Method for handling MBMS reception in wireless communications system" the contents of which are incorporated herein in their entirety.

BACKGROUND OF THE INVENTION

1. Field of the Invention

A method used in a wireless communication system and related communication device are provided, and more particularly to, a method of handling multimedia broadcast multicast service (MBMS) data reception on multiple component carriers in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network including a mobility management entity (MME), serving gateway, etc for NAS (Non Access Stratum) control.

A long term evolution-advanced (LTE-A) system, as its name implies, is an evolution of the LTE system, considering relaying for cost-effective throughput enhancement and coverage extension. For example, a relay can be deployed at the cell edge where the eNB is unable to provide required radio quality/throughput for the UEs or at certain location where radio signals of the eNB cannot cover. The LTE-A system can support a wider bandwidth up to 100 MHz to satisfy requirement for peak data rate. A carrier aggregation where two or more component carriers are aggregated is employed for the LTE-A system to achieve wider-band transmission. An LTE-A specification supports carrier aggregation for both continuous and non-continuous component carrier with each component carrier limited to a maximum of 110 resource blocks. The carrier aggregation increases spectrum flexibility by aggregating the component carriers in the different frequency band (non-continuous spectrum).

Since the delivery of identical content to multiple users via uni-cast transmission (bidirectional point-to-point transmission between the network and each of the multiple users) is a very inefficient method of transmission, a multimedia broadcast multicast service (MBMS) service may be introduced in LTE-A specification to give the opportunity to broadcast TV, film, information such as free overnight transmission of newspaper in digital form and other media in these networks. Compared with the uni-cast transmission, the MBMS service is a downlink only and point to multipoint connection from the network to multiple users or a specific group of the users. The broadcast capability of the MBMS service enables to reach unlimited number of users with constant network load. Further, the MBMS also enables the possibility to broadcast information simultaneously to many cellular subscribers.

Two important scenarios have been identified for the MBMS service. One is single-cell broadcast, and the second is MBMS Single frequency network (MBSFN). MBSFN is envisaged for delivering services such as Mobile TV, using the LTE infrastructure. In MBSFN the transmission happens from a tightly time-synchronized set of eNBs, using the same resource block. A UE receiver will therefore observe multiple versions of the signal with different delays due to the multi-cell transmission. Since the transmissions from the multiple cells are sufficiently tightly synchronized for each transmission to arrive at the UE, this makes the MBSFN transmission appear to the UE as a transmission from a single large cell, and the UE receiver may treat the multi-cell transmission in the same way as multi-path components of a single cell transmission without incurring any additional complexity.

The MBMS service was provided either on a dedicated carrier in which all subframes are used for MBSFN transmission, or on a mixed MBSFN/uni-cast carrier which is shared between MBMS and uni-cast service. Besides, the network transmits the same MBMS service data both in the dedicated carrier and the mixed MBSFN/uni-cast carrier for UEs with different releases (e.g. 3GPP specification rel.10 and Rel.9) since UEs with certain release do not support the dedicated carrier. However, for the UEs capable of supporting the dedicated carrier and the mixed MBSFN/uni-cast carrier, receiving the same MBMS data on both two component carrier causes power consumption.

SUMMARY OF THE INVENTION

A method of handling multimedia broadcast multicast service (MBMS) data reception on multiple component carriers in a wireless communication system is disclosed to specify how a mobile device receives the MBMS data on the multiple component carriers.

A method of handling multimedia broadcast multicast service (MBMS) data reception on multiple component carriers for a mobile device in a wireless communication system is disclosed. The mobile device has a maximum component carrier capability indicating the maximum number of component carriers accessible for the mobile device. The method comprises the steps of receiving a broadcast message or a dedicated message sent by the network, obtaining information about the number of the component carriers configured for the MBMS data reception, from the broadcast message or the dedicated message, and sending a first message to inform the network of a component carrier capability indicating the number of the component carriers on which the mobile device is not configured by the network to receive the MBMS data.

A method of handling multimedia broadcast multicast service (MBMS) data reception on multiple component carriers for a mobile device in a wireless communication system is disclosed. The mobile device has a maximum component carrier capability indicating the maximum number of component carriers accessible for the mobile device. The method comprises the steps of when the same MBMS data is transmitted on at least two of the component carries of the mobile device, selecting one of the component carriers transmitting the same MBMS data and receiving the MBMS data on the selected component carrier.

A communication device for handling multimedia broadcast multicast service (MBMS) data reception on multiple component carriers for a mobile device in a wireless communication system is disclosed. The mobile device has a maximum component carrier capability indicating the maximum number of component carriers accessible for the mobile device. The communication device comprises a means for receiving a broadcast message or a dedicated message sent by the network; a means for obtaining information about the number of the component carriers configured for the MBMS data reception, from the broadcast message or the dedicated message; and a means for sending a first message to inform the network of a component carrier capability indicating the number of the component carriers on which the mobile device is not configured by the network to receive the MBMS data.

A communication device for handling multimedia broadcast multicast service (MBMS) data reception on multiple component carriers for a mobile device in a wireless communication system is disclosed. The mobile device has a maximum component carrier capability indicating the maximum number of component carriers accessible for the mobile device. The communication device comprises a means for when the same MBMS data is transmitted on at least two of the component carries of the mobile device, selecting one of the component carriers transmitting the same MBMS data and a means for receiving the MBMS data on the selected component carrier.

These and other objectives of the present invention will no doubt become obvious to those of ordinary skill in the art after reading the following detailed description of the example that is illustrated in the various figures and drawings.

DETAILED DESCRIPTION

Figure 1:
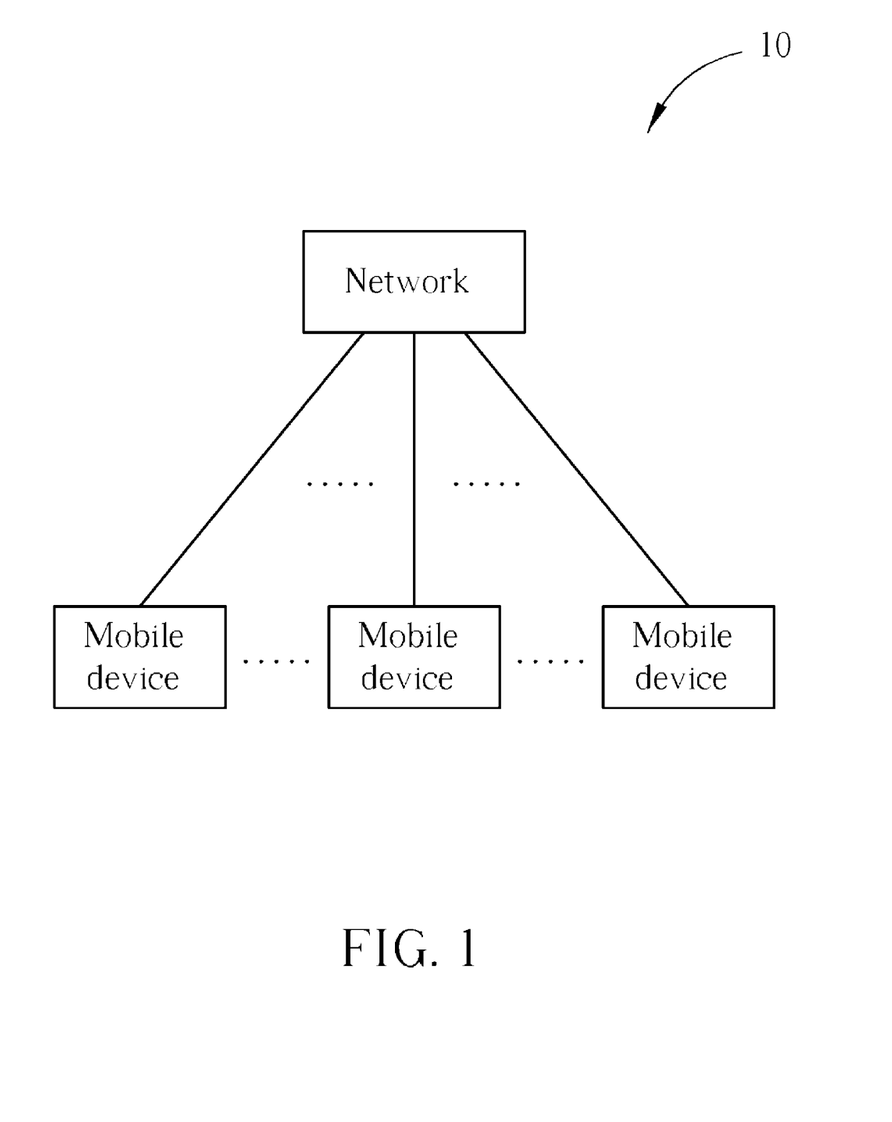
FIG. 1 is a schematic diagram of an exemplary wireless communication system.

Please refer to FIG. 1, which is a schematic diagram of an exemplary wireless communication system 10. The wireless communication system 10, such as an LTE-A (long-term evolution-advanced) system or other mobile communication systems supporting multiple component carriers with which simultaneous data transmission and/or reception can be performed, is briefly composed of a network and a plurality of user equipments (UEs). In FIG. 1, the network and the UEs are simply utilized for illustrating the structure of the wireless communication system 10. Practically, the network comprising a plurality of base stations, such as an E-UTRAN (evolved-UTAN) comprising a plurality of evolved Node-Bs (eNBs) in the LTE-A system. The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
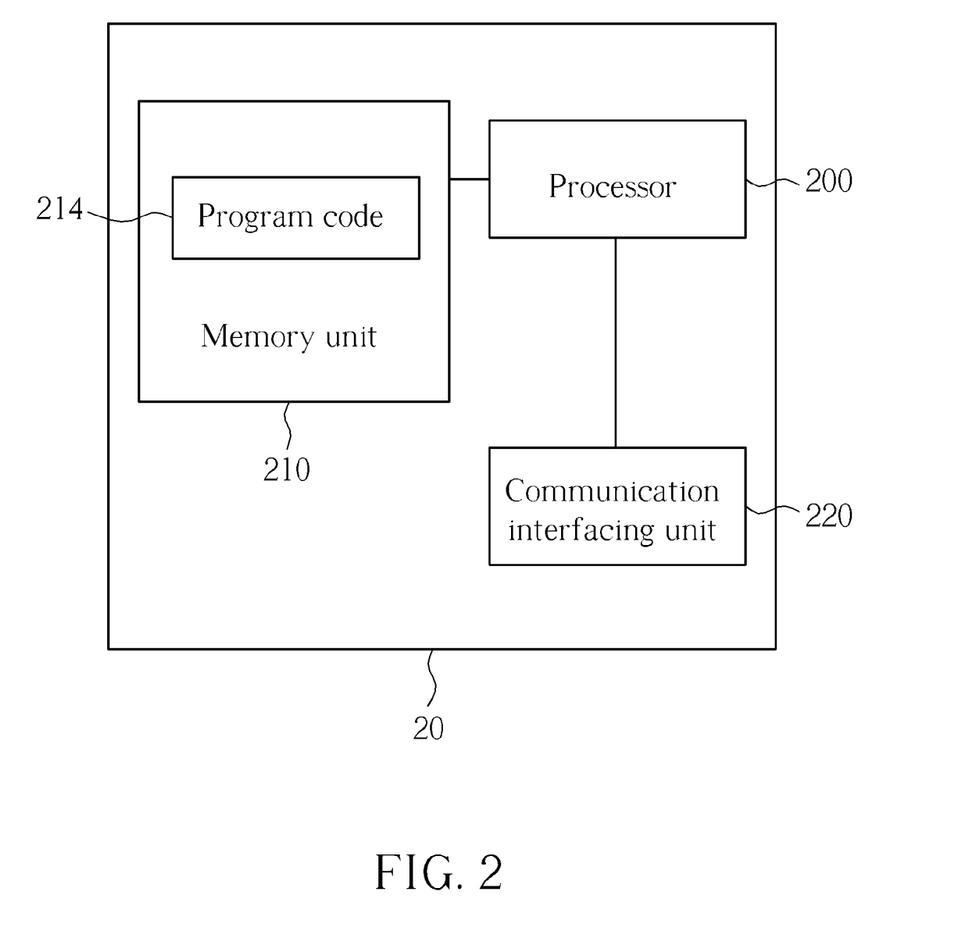
FIG. 2 is a schematic diagram of an exemplary communication device.

Please refer to FIG. 2, which is a schematic diagram of an exemplary communication device 20. The communication device 20 can be the UE or the network shown in FIG. 1 and includes a processor 200, a computer readable recording medium 210 and a communication interfacing unit 220. The computer readable recording medium 210 may be any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver for wirelessly communicating with other communication devices and can transform process results from the processor 200 into radio signals.

Figure 3:
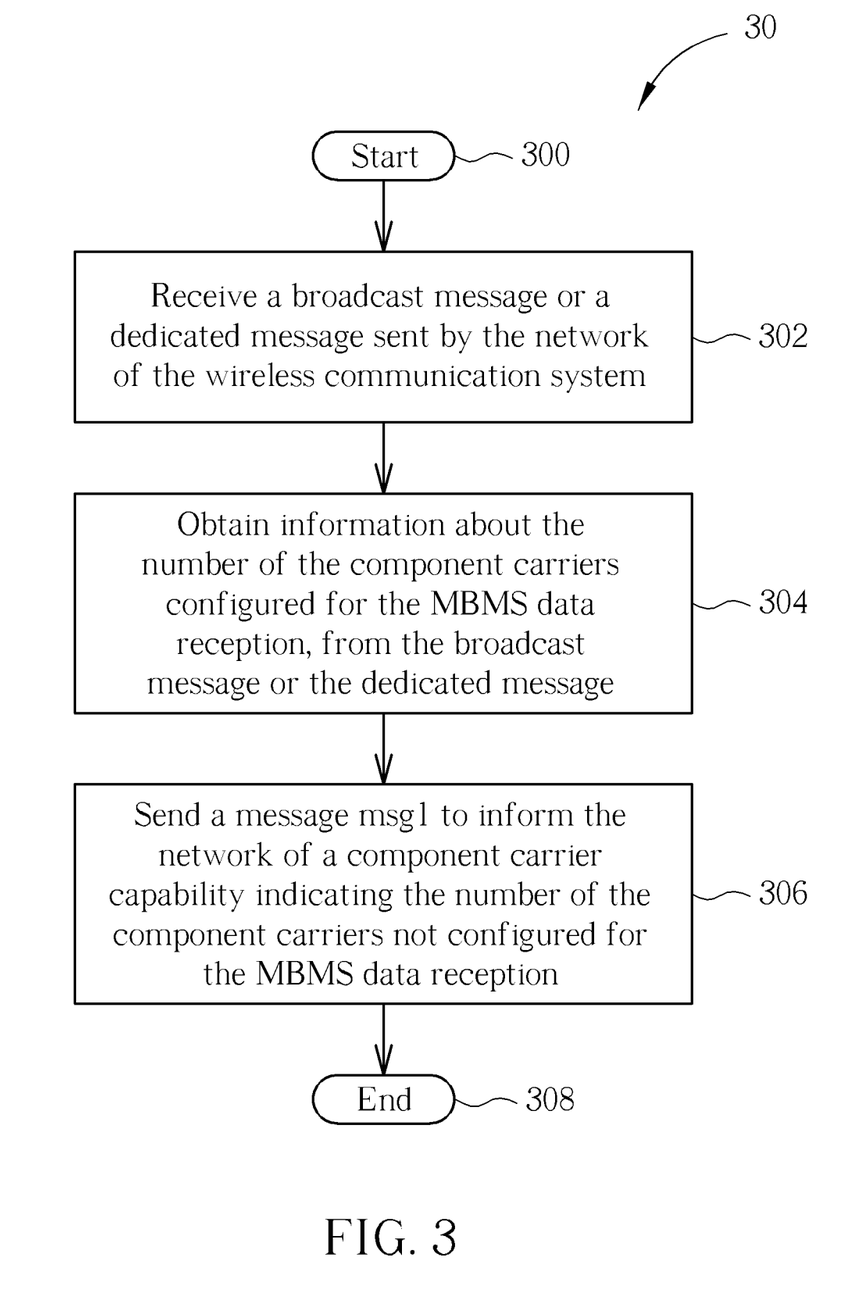
FIG. 3 is a flowchart of an exemplary process.

Please refer to FIG. 3, which is a flowchart of an exemplary process 30. The process 30 is used for handing multimedia broadcast multicast service (MBMS) data reception on multiple component carriers for a UE in a wireless communication system. The UE has a maximum component carrier capability indicating the maximum number of the component carriers accessible for the UE. The process 30 may be complied into the program 214 and include the following steps:

Step 300: Start.
Step 302: Receive a broadcast message or a dedicated message sent by the network of the wireless communication system.
Step 304: Obtain information about the number of the component carriers configured for the MBMS data reception, from the broadcast message or the dedicated message.
Step 306: Send a message msg1 to inform the network of a component carrier capability indicating the number of the component carriers not configured for the MBMS data reception.
Step 308: End.

According to the process 30, the UE may receive the broadcast message or the dedicated message from the network. Then from the broadcast message or the dedicated message, the UE may know the number of the component carriers configured by the network for the MBMS data. In the next step, the UE may send the message msg1 to inform the network of the component carrier capability. The component carrier capability denotes the number of the component carriers not configured for the MBMS data and equals to the maximum carrier capability minus the number of the component carriers configured for MBMS data reception. Through the process 30, the UE can report the residual component carrier capability to the network.

In some examples, the message msg1 may be a capability information message, for example a "UECapabilityinformation" message. Thus, when the UE is capable of receiving data on the multiple component carriers, the UE may send the message msg1 (e.g. "UECapabilityinformation" message) to the network in order to inform the network of the component carrier capability (the number of the component carriers not configured for the MBMS data).

For example, the UE has a maximum component carrier capability of M component carriers. The UE receives a broadcast message or a dedicated message from a network. The broadcast message or the dedicated message indicates that the MBMS data is transmitted by the network on n component carries, where n could be 1, 2, 3, . . . , M. According to the broadcast message or the dedicated message, the UE knows there are n component carries configured by the network to receive MBMS data. Then, the UE sends the UE "UECapabilityinformation" message to inform the network of the component carrier capability m=M−n. The component carrier capability m is in the likelihood of {m=0, 1, 2, 3, . . . , M−1}.

Beside, the UE may receive a message msg2 from the network. The message msg2 is used for informing the UE of the number of the component carriers configured for uni-cast data. Preferably, the message msg2 could be a "RRCConnectionRecongfiguration" message sent by the network. Namely, the UE may know the number of the component carriers configured for the MBMS data through the message msg1 and the number of the component carriers configured for the uni-cast data through the message msg2. When a total number of the component carriers configured for MBMS data and the component carriers configured for uni-cast data exceeds the maximum carrier capability, the UE may send a message msg3 to indicate to the network that a configuration failure occurs. The message msg3 could be any type of the response message in response to the message msg1 or the message msg2. In some examples, the UE may ignore data reception on some component carriers configured in the messages msg1 and msg2 when the total number of the component carriers configured for MBMS data and the component carriers configured for uni-cast data exceeds the maximum carrier capability. This means that the UE may not receive the MBMS data on some component carriers configured in the message msg1 or that the UE may not receive the uni-cast data on some component carriers configured in the message msg2, or that the UE may not receive the MBMS data and the uni-cast data configured both in the message msg1 and msg2. The total number of the component carriers (regardless of MBMS data or uni-cast data) ignored by the UE should be greater or equal to the exceeding number of the maximum carrier capability. Since data reception on some of the component carriers has been ignored, a new total number of the component carriers configured for MBMS data and the uni-cast data should be less or equal to the maximum carrier capability.

In some examples, the UE may prioritize the MBMS data reception and the uni-cast data reception when the total number of the component carriers configured for the MBMS data and the uni-cast data exceeds the maximum carrier capability. To be more specific, the UE may prioritize the component carries configured for the MBMS data reception higher than the component carries configured for the uni-cast data reception. Or, the UE may prioritize the component carries configured for the uni-cast data reception higher than the component carries configured for the MBMS data reception.

Figure 4:
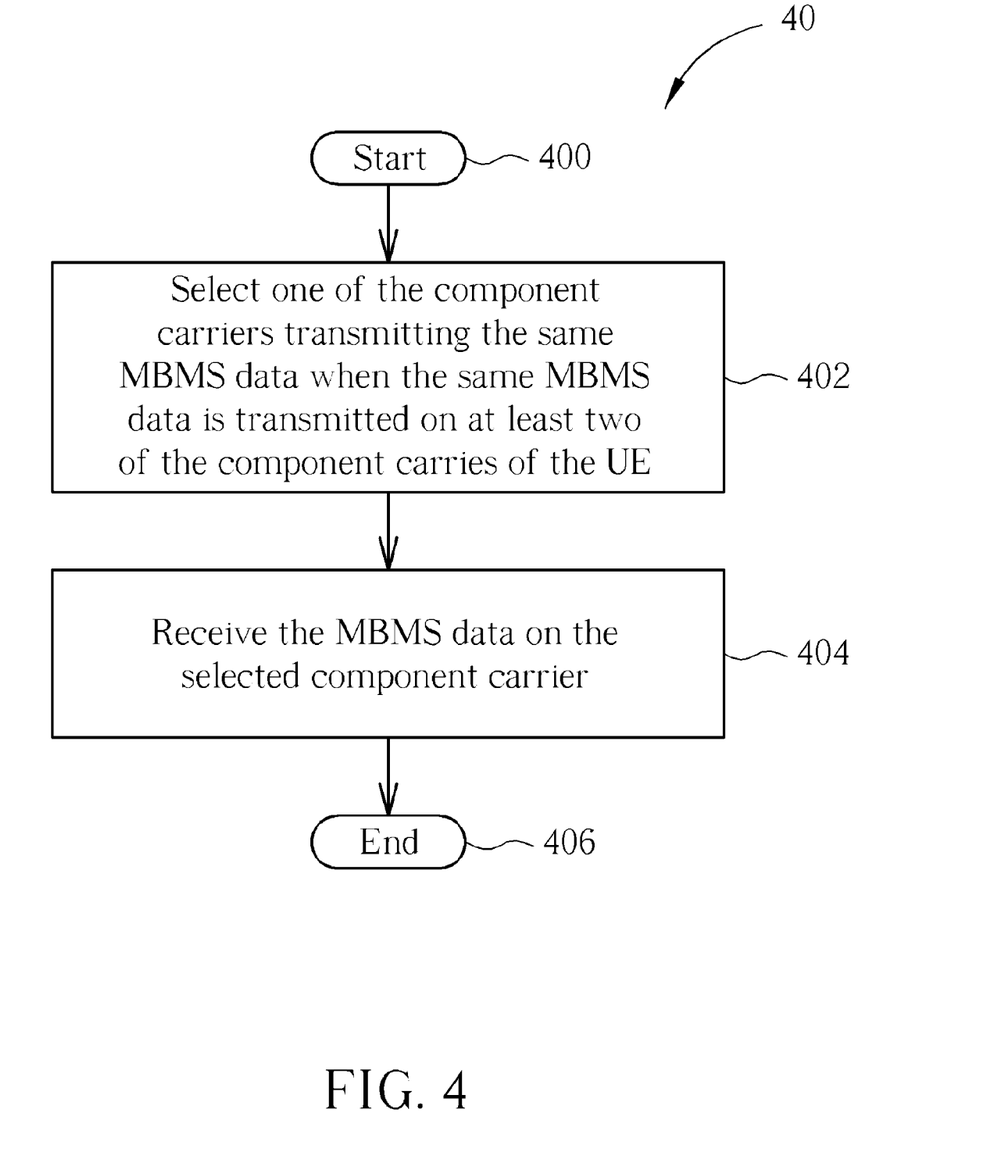
FIG. 4 is a flowchart of an exemplary process.

Please refer to FIG. 4, which is a flowchart of an exemplary process 40. The process 40 is used for handing MBMS data reception on multiple component carriers for a UE in a wireless communication system. The process 40 may be complied into the program code 214 and includes the following steps:

Step 400: Start.

Step 402: Select one of the component carriers transmitting the same MBMS data when the same MBMS data is transmitted on at least two of the component carries of the UE.

Step 404: Receive the MBMS data on the selected component carrier.

Step 406: End.

According to the process 40, when the same MBMS data may be transmitted on two or more component carriers, the UE may select one of the component carriers and receive the MBMS data on the selected component carrier. The UE may be referred as to a UE complying with LTE-A specification, for example a Rel.-9 UE, or a Rel.-10 UE. The Rel.-10 UE may receive the MBMS data on MBMS dedicated component carriers (i.e. component carries dedicated to the MBMS data) and mixed component carriers (i.e. component carries used for the MBMS data and the non-MBMS data) both. The Rel.-9 UE only receives the MBMS data on the mixed component carrier since the Rel.-9 UE does not support the MBMS dedicated component carriers. The component carriers may include one or more MBMS dedicated component carriers and one or more mixed component carriers used for both the MBMS data and the uni-cast data. In other words, when the same MBMS data is transmitted on the component carrier dedicated to the MBMS data and the mixed component carrier both, the UE may select one component carrier (either the component carrier dedicated to the MBMS data or the mixed component carrier) to avoid receive the same MBMS data repeatedly.

In some example, the UE (e.g. Rel.-10 UE) may regard the component carriers dedicated to the MBMS data as candidates of the selected component carrier. Namely, the selected component carrier is chosen from one or more component carriers dedicated to the MBMS data. In some example, when the total number of the component carriers configured for the MBMS data and the uni-cast data exceeds the maximum carrier capability, the UE may regard the mixed component carriers as candidates of the selected component carrier. Namely, the selected component carrier is chosen from one or more mixed component carriers. In this situation, the total number of the component carriers configured for the MBMS data and the uni-cast data may be reduced since the UE can receive both of the MBMS data and the uni-cast data reception on the mixed component carriers.

In some examples, the UE may select the selected component carrier to receive the MBMS data according to a quality of service (QoS) setting of the MBMS data or the device configuration. Namely, the UE may select the component carrier with the highest QoS setting to receive the MBMS data. The QoS setting may be referred as to modulation and coding scheme (MCS) or the content resolution but not limited herein. Or, the UE may determine the selected component carrier according to the device configuration. For example, if a monitor of the UE has the highest resolution of 800×600 pixels, it is unnecessary to select the component carrier carrying the MBMS data more delicate than that monitor's resolution. It is because that the monitor may not be able to accommodate its resolution to such high quality MBMS data.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the abovementioned processes and the processed results can handle MBMS data reception on multiple component carriers for a mobile device in a wireless communication system.

To sum up, when the UE is capable of receiving data on multiple component carriers, the UE may send the message msg1 to inform the network of the number of the component carriers not configured for the MBMS data reception. Besides, when the same MBMS data is transmitted on two or more component carriers, the UE may select only one of the component carries to avoid receiving the same data repeatedly.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of handling multimedia broadcast multicast service (MBMS) data reception for a mobile device in a wireless communication system, the method comprising the steps of:

receiving a broadcast message or a dedicated message sent by a network;

obtaining information about the MBMS data reception, from the broadcast message or the dedicated message; and sending a first message to inform the network of a component carrier capability indicating a maximum number of component carriers for uni-cast data reception;

wherein two or more component carriers are aggregated for transmission in a carrier aggregation supported by the wireless communication system conformed to a long term evolution-advanced (LTE-A) standard.

2. The method of claim 1, wherein the mobile device has a maximum carrier capability indicating a maximum number of component carriers accessible for the mobile device, and component carrier capability equals to the maximum carrier capability minus the number of the component carriers for MBMS data reception.

3. A method of handling multimedia broadcast multicast service (MBMS) data reception for a mobile device in a wireless communication system, the mobile device having a maximum carrier capability indicating a maximum number of component carriers for uni-cast and MBMS data reception, the method comprising the steps of:

sending a first message to inform the network of the maximum carrier capability;

receiving a second message configuring the mobile device about the component carriers for uni-cast data reception, from the network; and ignoring data reception on partial component carriers for MBMS data reception or configured for uni-cast data reception in the second messages when a total number of the component carriers for MBMS data reception and the component carriers configured for uni-cast data reception exceeds the maximum carrier capability;

wherein two or more component carriers are aggregated for transmission in a carrier aggregation supported by the wireless communication system conformed to a long term evolution-advanced (LTE-A) standard.

4. The method of claim 3 further comprises indicating a configuration failure to the network through a third message in response to the second message.

5. The method of claim 3, wherein the partial component carriers are not serving component carriers.

6. A method of handling multimedia broadcast multicast service (MBMS) data reception on multiple component carriers for a mobile device in a wireless communication system, the mobile device having a component carrier capability indicating the maximum number of component carriers accessible for the mobile device, the method comprising the steps of:

when the same MBMS data is transmitted on at least two of the component carries of the mobile device, selecting one of the component carriers transmitting the same MBMS data; comprising:

when the same MBMS data is transmitted on the component carries of the mobile device, selecting one of the component carriers transmitting the same MBMS data according to quality of service (QoS) setting of the MBMS data or device configuration; and receiving the MBMS data on the selected component carrier.

7. The method of claim 6, wherein when the same MBMS data is transmitted on at least two of the component carries of the mobile device, selecting one of the component carriers transmitting the same MBMS data comprises:

when the same MBMS data is transmitted on the component carries of the mobile device, determining that the component carriers that transmit the same MBMS data are component carriers dedicated for the MBMS data as candidates for the MBMS reception; or when the same MBMS data is transmitted on the component carries of the mobile device and a total number of the component carriers configured for MBMS data and the component carriers configured for uni-cast data exceeds the maximum carrier capability, determining that the component carriers that transmits the same MBMS data are mixed component carriers for both the MBMS data and uni-cast data as candidates for the MBMS reception; and selecting one of the candidates for the MBMS reception.

8. A communication device for handling multimedia broadcast multicast service (MBMS) data reception on multiple component carriers for a mobile device in a wireless communication system, the communication device comprising:

a non-transitory computer readable recording medium for storing a program code corresponding to a process; and a processor coupled to the computer readable recording medium, for processing the program code to execute the process;

wherein the process comprises:

receiving a broadcast message or a dedicated message sent by a network;

obtaining information about the MBMS data reception, from the broadcast message or the dedicated message; and sending a first message to inform the network of a component carrier capability indicating a maximum number of component carriers for uni-cast data reception;

wherein two or more component carriers are aggregated for transmission in a carrier aggregation supported by the wireless communication system conformed to a long term evolution-advanced (LTE-A) standard.

9. The communication device of claim 8, wherein the mobile device has a maximum carrier capability indicating a maximum number of component carriers accessible for the mobile device, and component carrier capability equals to the maximum carrier capability minus the number of the component carriers for MBMS data reception.

10. A communication device for handling multimedia broadcast multicast service (MBMS) data reception in a wireless communication system, the communication device having a maximum carrier capability indicating a maximum number of component carriers for uni-cast and MBMS data reception and comprising:

a non-transitory computer readable recording medium for storing a program code corresponding to a process; and a processor coupled to the computer readable recording medium, for processing the program code to execute the process;

wherein the process comprises:

sending a first message to inform the network of the maximum carrier capability;

receiving a second message configuring the mobile device about the component carriers for uni-cast data reception, from the network; and ignoring data reception on partial component carriers for MBMS data reception or configured for uni-cast data reception in the second messages when a total number of the component carriers for MBMS data reception and the component carriers configured for uni-cast data reception exceeds the maximum carrier capability;

wherein two or more component carriers are aggregated for transmission in a carrier aggregation supported by the wireless communication system conformed to a long term evolution-advanced (LTE-A) standard.

11. The communication device of claim 10, wherein the process further comprises indicating a configuration failure to the network through a third message in response to the second message.

12. The communication device of claim 10, wherein the partial component carriers are not serving component carriers.

13. A communication device for handling multimedia broadcast multicast service (MBMS) data reception on multiple component carriers for a mobile device in a wireless communication system, the mobile device having a component carrier capability indicating the maximum number of component carriers accessible for the mobile device, the communication device comprising:
a non-transitory computer readable recording medium for storing a program code corresponding to a process; and
a processor coupled to the computer readable recording medium, for processing the program code to execute the process;
wherein the process comprises:
when the same MBMS data is transmitted on at least two of the component carries of the mobile device, selecting one of the component carriers transmitting the same MBMS data; comprising:
when the same MBMS data is transmitted on the component carries of the mobile device, selecting one of the component carriers transmitting the same MBMS data according to a quality of service (QoS) setting of the MBMS data or device configuration; and
receiving the MBMS data on the selected component carrier.

14. The communication device of claim 13, wherein the when the same MBMS data is transmitted on at least two of the component carries of the mobile device, selecting one of the component carriers transmitting the same MBMS data comprises:
when the same MBMS data is transmitted on the component carries of the mobile device, determining that the component carriers that transmit the same MBMS data are component carriers dedicated for the MBMS data as candidates for the MBMS reception; or
when the same MBMS data is transmitted on the component carries of the mobile device and a total number of the component carriers configured for MBMS data and the component carriers configured for uni-cast data exceeds the maximum carrier capability, determining that the component carriers that transmits the same MBMS data are mixed component carriers for both the MBMS data and uni-cast data as candidates for the MBMS reception; and
selecting one of the candidates for the MBMS reception.

* * * * *